(12) United States Patent
Uesaka et al.

(10) Patent No.: US 8,045,131 B2
(45) Date of Patent: *Oct. 25, 2011

(54) TRANSMISSIVE LIQUID CRYSTAL DISPLAY DEVICE

(75) Inventors: Tetsuya Uesaka, Yokohama (JP); Satoru Ikeda, Yokohama (JP)

(73) Assignee: Nippon Oil Corporation, Tokyo (JP)

( * ) Notice: Subject to any disclaimer, the term of this patent is extended or adjusted under 35 U.S.C. 154(b) by 263 days.

This patent is subject to a terminal disclaimer.

(21) Appl. No.: 12/514,815

(22) PCT Filed: Oct. 30, 2007

(86) PCT No.: PCT/JP2007/071457
§ 371 (c)(1),
(2), (4) Date: May 14, 2009

(87) PCT Pub. No.: WO2008/059722
PCT Pub. Date: May 22, 2008

(65) Prior Publication Data
US 2010/0085522 A1    Apr. 8, 2010

(30) Foreign Application Priority Data
Nov. 17, 2006   (JP) .................................. 2006-311745

(51) Int. Cl.
*G02F 1/1337* (2006.01)
(52) U.S. Cl. ........ 349/191; 349/122; 349/123; 349/127; 349/129; 349/187
(58) Field of Classification Search .................. 349/122, 349/123, 127, 129, 187, 191
See application file for complete search history.

(56) References Cited

U.S. PATENT DOCUMENTS

| | | |
|---|---|---|
| 5,460,748 A | 10/1995 | Mazaki et al. |
| 5,578,243 A | 11/1996 | Mazaki et al. |
| 5,635,105 A | 6/1997 | Kawata et al. |

(Continued)

FOREIGN PATENT DOCUMENTS

EP    0926534 A2    6/1999

(Continued)

OTHER PUBLICATIONS

EP Supplemental Search Report issued on Jun. 28, 2010 in EP Application No. 08 70 4390.

(Continued)

*Primary Examiner* — Jennifer Doan
(74) *Attorney, Agent, or Firm* — Panitch Schwarze Belisario & Nadel LLP

(57) ABSTRACT

The present invention provides a transparent liquid crystal display device which is less in display characteristics and viewing angle dependency and can provide bright images and high contrasts. The transparent liquid crystal display device comprises at least: a backlight; a polarizer; a second optical anisotropic layer with a retardation of 50 to 180 nm at a wavelength of 550 nm; a first optical anisotropic layer with a retardation of 20 to 140 nm at a wavelength of 550 nm; a homogeneously aligned liquid crystal cell comprising upper and lower substrates facing each other and a liquid crystal layer sandwiched between the upper and lower substrates; a third optical anisotropic layer with a retardation of 50 to 200 nm at a wavelength of 550 nm; and a polarizer, arranged in piles in this order from the backlight, wherein the first optical anisotropic layer comprising at least a liquid crystal film with a fixed nematic hybrid liquid crystal alignment structure.

13 Claims, 10 Drawing Sheets

U.S. PATENT DOCUMENTS

| | | | |
|---|---|---|---|
| 5,646,703 A | 7/1997 | Kamada et al. | |
| 6,628,359 B1 | 9/2003 | Terashita et al. | |
| 6,630,973 B1 | 10/2003 | Matsuoka et al. | |
| 6,693,693 B1 | 2/2004 | Okita et al. | |
| 6,903,789 B1 | 6/2005 | Cutler et al. | |
| 6,937,308 B2 | 8/2005 | Ishikawa et al. | |
| 7,719,644 B2 | 5/2010 | Fukagawa et al. | |
| 7,826,017 B2 | 11/2010 | Uesaka | |
| 7,872,716 B2 * | 1/2011 | Nagai | 349/119 |
| 2002/0005925 A1 | 1/2002 | Arakawa | |
| 2002/0130997 A1 | 9/2002 | Yano et al. | |
| 2003/0025862 A1 | 2/2003 | Yoda | |
| 2003/0164921 A1 | 9/2003 | Uesaka et al. | |
| 2003/0169391 A1 | 9/2003 | Uchida et al. | |
| 2004/0119914 A1 | 6/2004 | Tsuchiya | |
| 2004/0257498 A1 | 12/2004 | Uesaka et al. | |
| 2005/0057714 A1 | 3/2005 | Jeon et al. | |
| 2008/0062375 A1 | 3/2008 | Naka | |
| 2008/0192191 A1 | 8/2008 | Nakamura et al. | |
| 2009/0161053 A1 | 6/2009 | Kaneiwa et al. | |
| 2009/0185111 A1 | 7/2009 | Uesaka et al. | |
| 2009/0284689 A1 | 11/2009 | Ikeda et al. | |
| 2010/0182544 A1 | 7/2010 | Ikeda et al. | |

FOREIGN PATENT DOCUMENTS

| | | |
|---|---|---|
| EP | 0 928 984 A2 | 7/1999 |
| EP | 0 646 829 B1 | 7/2002 |
| JP | 06-347742 A | 12/1994 |
| JP | 08-27284 A | 1/1996 |
| JP | 2640083 B2 | 5/1997 |
| JP | 11-194325 A | 7/1999 |
| JP | 11194371 A | 7/1999 |
| JP | 11-352328 A | 12/1999 |
| JP | 2000-111914 A | 4/2000 |
| JP | 2000-235185 A | 8/2000 |
| JP | 2001-004837 A | 1/2001 |
| JP | 2001-166144 A | 6/2001 |
| JP | 2001-235747 A | 8/2001 |
| JP | 2002-031717 A | 1/2002 |
| JP | 2003-262869 A | 9/2003 |
| JP | 2004-125830 | 4/2004 |
| JP | 2004-157454 A | 6/2004 |
| JP | 2005-189633 A | 7/2005 |
| JP | 2005-202101 A | 7/2005 |
| JP | 2008-064843 A | 3/2008 |
| WO | 2004/031846 A1 | 4/2004 |

OTHER PUBLICATIONS

CVI Melles Griot, "XP-002581822 Polarization Tutorial", CVI Laser Optics and Coatings, pp. 202-206, May 5, 2010 retrieved from internet: http://cvimellesgriot.com/Products/Documents/GeneralInfo/PolarizationTutorial.pdf.

P. Van De Witte et al., "Viewing Angle Compensators for Liquid Crystal Displays based on Layers with a Positive Birefringence", Japanese Journal of Applied Physics, vol. 39, Part 1, No. 1, pp. 101-108, Jan. 2000.

Destrade, C. et al., "Disc-like Mesogens: A Classification," Molecular Crystals and Liquid Crystals, vol. 71, Nos. 1 and 2, pags, 111-135, 1981.

"The Chemistry of Liquid Crystals," Quarterly Chemistry Survey, No. 22, Chapter 5 and Chapter 10, Section 2, 1994 (edited by Japan Chemical Society).

Kohne, B. et al., "Hexa-O-alkanoyl-scyllo-inosite, die ersten discotischen Fussigkristalle aus alicyclischen, gesattigten Verbindugnen," Angewandte Chemie, vol. 96, pp. 70-71, 1984.

Lehn, J. et al., "Tubular Mesophases: Liquid Crystals consisting of Macrocyclic Molecules," Journal of the Chemical Society, Chemical Communications, No. 24, pp. 1794-1796, 1985.

Zhang, J. et al., "Liquid Crystals Based on Shape-Persistent Macrocyclic Mesogens," Journal of the American Chemical Society, vol. 116, pp. 2655-2656, 1994.

U.S. Office Action issued Feb. 5, 2010 in U.S. Appl. No. 12/094,404.

EP Supplemental Search Report issued Oct. 16, 2009 from the European Patent Office in European Application No. 06 83 2475.

U.S. Office Action issued Dec. 31, 2009 in U.S. Appl. No. 12/278,683.

Notice of Allowance issued on Nov. 19, 2010 from the U.S. Patent Office in U.S. Appl. No. 12/094,295.

Notice of Allowance issued on Jul. 13, 2010 from the U.S. Patent Office in U.S. Appl. No. 12/278,683.

Notice of Allowance issued on Oct. 18, 2010 from the U.S. Patent Office in U.S. Appl. No. 12/094,404.

U.S. Notice of Allowance issued May 6, 2011 in U.S. Appl. No. 12/602,584.

* cited by examiner

TRANSMISSIVE LIQUID CRYSTAL DISPLAY DEVICE

CROSS-REFERENCE TO RELATED APPLICATIONS

This application is a Section 371 of International Application No. PCT/JP2007/071457, filed Oct. 30, 2007, which was published in the Japanese language on May 22, 2008, under International Publication No. WO 2008/059722 A1 and the disclosure of which is incorporated herein by reference.

BACKGROUND OF THE INVENTION

The present invention to transmissive liquid crystal display devices used for office automation (OA) equipment such as word processors and personal computers, mobile information terminals such as a personal digital assistants and mobile telephones, or camcorders equipped with a liquid crystal monitor.

A liquid crystal display device typically comprises a liquid crystal cell, a polarizer and an optical compensation sheet (retardation plate). A transmissive liquid crystal display device comprises a pair of polarizers, a liquid crystal cell sandwiched therebetween, a single or plurality of optical compensation sheets disposed between the liquid crystal cell and either one or both of the polarizers.

The liquid crystal cell comprises rod-like liquid crystalline molecules, a pair of substrates for enclosing the molecules and electrode layers for applying an electric voltage to the molecules. Examples of the mode of a liquid crystal cell include TN (Twisted Nematic), STN (Super Twisted Nematic), ECB (Electrically Controlled Birefringence), IPS (In-Plane Switching), VA (Vertical Alignment), OCB (Optically Compensated Birefringence), HAN (Hybrid-Aligned Nematic), ASM (Axially Symmetric Aligned Microcell), Half Tone Gray Scale modes, domain divided mode, and display modes using a ferroelectric liquid crystal and an antiferroelectric liquid crystal.

The transmissive liquid crystal display devices can not avoid problems concerning viewing angle such as reduced display contrast, changes in display color and reversed gradation occurring when viewed obliquely because of the refractive index anisotropy of the liquid crystal molecules and thus has been demanded to be improved in these regards.

For a transmissive liquid crystal display device using a TN mode (twisted angle of liquid crystal is 90 degrees), a method for solving these problems has been proposed and practically used wherein optical compensation films are disposed between the liquid crystal cell and each of the upper and lower polarizers.

For example, there are known some structures wherein an optical compensation film composed of hybrid-aligned discotic liquid crystal or nematic hybrid-aligned liquid crystalline polymer is disposed between the liquid crystal cell and each of the upper and lower polarizers (Patent Documents 1 to 3 below).

However, the TN mode can improve the range where contrast widens but is wide in the range where gradation reverses and thus is not necessarily sufficient in viewing angle characteristics. This is because the range where gradation reverses is widened by the molecules in the liquid crystal cell slanting up to the 90 degree direction due to that the liquid crystal layer is twisted at 90 degrees.

For the reasons described above, the mode of a liquid crystal cell is preferably a display mode using an ECB mode wherein the liquid crystal molecules are twisted at an angle of zero degree and homogeneously aligned in the sense of narrowing the range where gradation reverses. An arrangement for improving the viewing angle of the ECB mode is proposed wherein two nematic hybrid-aligned optical compensation films and two uniaxial retardation films are disposed so that each of the compensation films and each of the retardation films are located above and below the homogeneous liquid crystal cell, respectively (Patent Document 4).

However, this method can not solve the problems concerning viewing angle such as reduced display contrast, changes in display color and reversed gradation occurring when the liquid crystal display device is viewed obliquely and has left problems including large fluctuations in displaying characteristics due to the variation in the parameter of each film, the increased total film thickness, and the lower reliability of the device because of the use of four films in total above and below the cell, all of which have been demanded to improve.

(1) Patent Document 1: Japanese Patent Publication No. 2640083
(2) Patent Document 2: Japanese Patent Application Laid-Open Publication No. 11-194325
(3) Patent Document 3: Japanese Patent Application Laid-Open Publication No. 11-194371
(4) Patent Document 4: Japanese Patent Application Laid-Open Publication No. 2005-202101

BRIEF SUMMARY OF THE INVENTION

The present invention intends to solve the above-described problems and provide a transmissive liquid crystal display device that is less in display characteristics fluctuations, bright in display images, high in contrast and less in viewing angle dependency.

According to a first aspect of the present invention, there is provided a transmissive liquid crystal display device comprising at least:
 a backlight;
 a polarizer;
 a second optical anisotropic layer with a retardation of 50 to 180 nm at a wavelength of 550 nm;
 a first optical anisotropic layer with a retardation of 20 to 140 nm at a wavelength of 550 nm;
 a homogeneously aligned liquid crystal cell comprising upper and lower substrates facing each other and a liquid crystal layer sandwiched between the upper and lower substrates;
 a third optical anisotropic layer with a retardation of 50 to 200 nm at a wavelength of 550 nm; and
 a polarizer, arranged in piles in this order from the backlight,
 wherein the first optical anisotropic layer comprises at least a liquid crystal film with a fixed nematic hybrid liquid crystal alignment structure.

According to a second aspect of the present invention, there is provided a transmissive liquid crystal display device comprising at least:
 a backlight;
 a polarizer;
 a third optical anisotropic layer with a retardation of 50 to 200 nm at a wavelength of 550 nm;
 a homogeneously aligned liquid crystal cell comprising upper and lower substrates facing each other and a liquid crystal layer sandwiched between the upper and lower substrates;
 a first optical anisotropic layer with a retardation of 20 to 140 nm at a wavelength of 550 nm;

a second optical anisotropic layer with a retardation of 50 to 180 nm at a wavelength of 550 nm; and a polarizer, arranged in piles in this order from the backlight, wherein the first optical anisotropic layer comprises at least a liquid crystal film with a fixed nematic hybrid liquid crystal alignment structure.

According to a third aspect of the present invention, there is provided a transmissive liquid crystal display device comprising at least:

a backlight;

a polarizer;

a first optical anisotropic layer with a retardation of 20 to 140 nm at a wavelength of 550 nm;

a homogeneously aligned liquid crystal cell comprising upper and lower substrates facing each other and a liquid crystal layer sandwiched between the upper and lower substrates;

a second optical anisotropic layer with a retardation of 50 to 180 nm at a wavelength of 550 nm;

a third optical anisotropic layer with a retardation of 50 to 200 nm at a wavelength of 550 nm; and a polarizer, arranged in piles in this order from the backlight, wherein the first optical anisotropic layer comprises at least a liquid crystal film with a fixed nematic hybrid liquid crystal alignment structure.

According to a fourth aspect of the present invention, there is provided a transmissive liquid crystal display device comprising at least:

a backlight;

a polarizer;

a third optical anisotropic layer with a retardation of 50 to 200 nm at a wavelength of 550 nm;

a second optical anisotropic layer with a retardation of 50 to 180 nm at a wavelength of 550 nm;

a homogeneously aligned liquid crystal cell comprising upper and lower substrates facing each other and a liquid crystal layer sandwiched between the upper and lower substrates;

a first optical anisotropic layer with a retardation of 20 to 140 nm at a wavelength of 550 nm; and a polarizer, arranged in piles in this order from the backlight, wherein the first optical anisotropic layer comprises at least a liquid crystal film with a fixed nematic hybrid liquid crystal alignment structure.

According to a fifth aspect of the present invention, there is provided a transmissive liquid crystal display device comprising at least:

a backlight;

a polarizer;

a second optical anisotropic layer with a retardation of 50 to 180 nm at a wavelength of 550 nm;

a homogeneously aligned liquid crystal cell comprising upper and lower substrates facing each other and a liquid crystal layer sandwiched between the upper and lower substrates;

a first optical anisotropic layer with a retardation of 20 to 140 nm at a wavelength of 550 nm;

a third optical anisotropic layer with a retardation of 50 to 200 nm at a wavelength of 550 nm; and a polarizer, arranged in piles in this order from the backlight, wherein the first optical anisotropic layer comprises at least a liquid crystal film with a fixed nematic hybrid liquid crystal alignment structure.

According to a sixth aspect of the present invention, there is provided a transmissive liquid crystal display device comprising at least:

a backlight;

a polarizer;

a third optical anisotropic layer with a retardation of 50 to 200 nm at a wavelength of 550 nm;

a first optical anisotropic layer with a retardation of 20 to 140 nm at a wavelength of 550 nm;

a homogeneously aligned liquid crystal cell comprising upper and lower substrates facing each other and a liquid crystal layer sandwiched between the upper and lower substrates;

a second optical anisotropic layer with a retardation of 50 to 180 nm at a wavelength of 550 nm; and a polarizer, arranged in piles in this order from the backlight, wherein the first optical anisotropic layer comprises at least a liquid crystal film with a fixed nematic hybrid liquid crystal alignment structure.

According to a seventh aspect of the present invention, there is provided the transmissive liquid crystal display device according to any one of the foregoing aspects, wherein the second and third optical anisotropic layers each comprise a thermoplastic polymer containing a polycarbonate resin or a poly(cyclo-olefin) resin.

According to an eighth aspect of the present invention, there is provided the transmissive liquid crystal display device according to any one of the foregoing aspects, wherein the second and third optical anisotropic layers are each a liquid crystal film produced by fixing a liquid crystalline substance exhibiting an optically positive uniaxiality, in a nematic alignment formed when the substance is in the liquid crystal state.

According to a ninth aspect of the present invention, there is provided the transmissive liquid crystal display device according to any one of the foregoing aspects, wherein the polarizer and the third optical anisotropic layer are laminated so that the absorption axis of the former is perpendicular or parallel to the slow axis of the latter.

According to a tenth aspect of the present invention, there is provided the transmissive liquid crystal display device according to any one of the foregoing aspects, wherein the angle defined by the tilt direction of the hybrid direction of the liquid crystal film forming the first optical anisotropic layer, projected to the substrate plane thereof and the rubbing direction of the liquid crystal layer is in the range of 30 degrees or smaller.

According to an eleventh aspect of the present invention, there is provided the transmissive liquid crystal display device according to any one of the foregoing aspects, wherein the angle defined by the tilt direction of the hybrid direction of the liquid crystal film forming the first optical anisotropic layer, projected to the substrate plane thereof and the slow axis of the second optical anisotropic layer is in the range of 70 degrees or larger and 110 degrees or smaller.

According to a twelfth aspect of the present invention, there is provided that the transmissive liquid crystal display device according to any one of the foregoing aspects, wherein the angle defined by the absorption angle of the polarizer and the tilt direction of the hybrid direction of the liquid crystal film forming the first optical anisotropic layer, projected to the substrate plane thereof is in the range of 30 degrees or larger and 60 degrees or smaller.

According to a thirteenth aspect of the present invention, there is provided the transmissive liquid crystal display device according to any one of the foregoing aspects, wherein the first optical anisotropic layer is a liquid crystal film produced by fixing a liquid crystalline substance exhibiting an optically positive uniaxiality, in a nematic hybrid alignment formed when the substance is in the liquid crystal state, the average tilt angle of the nematic hybrid alignment being in the range of 5 to 45 degrees.

The transmissive liquid crystal display device of the present invention has characteristics that it is bright in display images, high in contrast and less in viewing angle dependency.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
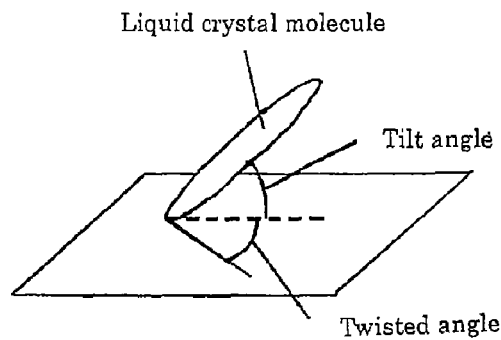
FIG. 1 is a conceptual view for describing the tilt and twisted angles of a liquid crystal molecule.

The present invention will be described in more detail below.

The transmissive liquid crystal display device of the present invention has a configuration selected from the following six patterns and if necessary may contain additional components such as a light diffusing layer, a light control film, a light guide plate and a prism sheet, on which no particular restriction is imposed. Any of the configuration patterns (1) to (6) may be used in order to obtain optical characteristics with less viewing angle dependency.

(1) polarizer/third optical anisotropic layer/liquid crystal cell/first optical anisotropic layer/second optical anisotropic layer/polarizer/backlight (2) polarizer/second optical anisotropic layer/first optical anisotropic layer/liquid crystal cell/third optical anisotropic layer/polarizer/backlight (3) polarizer/third optical anisotropic layer/second optical anisotropic layer/liquid crystal cell/first optical anisotropic layer/polarizer/backlight (4) polarizer/first optical anisotropic layer/liquid crystal cell/second optical anisotropic layer/third optical anisotropic layer/polarizer/backlight (5) polarizer/third optical anisotropic layer/first optical anisotropic layer/liquid crystal cell/second optical anisotropic layer/polarizer/backlight (6) polarizer/second optical anisotropic layer/liquid crystal cell/first optical anisotropic layer/third optical anisotropic layer/polarizer/backlight The liquid crystal cell used in the present invention will be described below.

The mode of the liquid crystal cell used in the present invention is a homogeneously aligned cell mode. The homogeneously aligned cell used herein is a cell with a twisted angle of substantially zero degree. The term "substantially zero degree" refers to an angle of zero degree or greater and 5 degrees or smaller. The retardation (Δnd) of the liquid crystal cell is preferably from 200 to 400 nm, more preferably from 230 to 350 nm. A retardation deviating from these ranges is not preferable because undesired coloration or reduced brightness would be invited.

There is no particular restriction on the driving mode of the liquid crystal cell, which may, therefore, be a passive matrix mode used in an STN-LCD, an active matrix mode using active electrodes such as TFT (Thin Film Transistor) electrodes and TFD (Thin Film Diode) electrodes, and a plasma address mode.

The liquid crystal cell is composed of a liquid crystal layer sandwiched between two transparent substrate disposed to face each other(the viewer's side substrate may be referred to as "upper substrate" and the backlight side's substrate may be referred to as "lower substrate").

There is no particular restriction on the material forming the liquid crystal layer. Examples of the material include various low molecular weight liquid crystalline substances, polymeric liquid crystalline substances, and mixtures thereof, which can constitute various liquid crystal cells. The liquid crystalline material may be blended with dyes, chiral dopants, or non-liquid crystalline substances to an extent that they do not prevent the liquid crystal substance from exhibiting liquid crystallinity. The liquid crystal cell may be provided with various components required for the above-described various liquid crystal cell modes or various components described below.

There is no particular restriction on the transparent substrates forming the liquid crystal cell as long as they can align a liquid crystalline material forming a liquid crystal layer in a specific alignment direction. More specific examples include those which themselves have a property of aligning a liquid crystalline material and those which themselves have no capability of aligning but are provided with an alignment layer capable of aligning a liquid crystalline material. The electrode of the liquid crystal cell may be any conventional electrode, such as ITO. The electrode may be usually arranged on the surface of the transparent substrate, which surface contacts the liquid crystal layer. In the case of using a transparent substrate with an alignment layer, an electrode may be provided between the alignment layer and the substrate.

There is no particular limitation on the polarizer used in the present invention as long as the objects of the present invention can be achieved. Therefore, the polarizer may be any conventional ones that are generally used in liquid crystal display devices. Specific examples include PVA-based polarizing films such as polyvinyl alcohol (PVA) and partial acetalized PVA, polarizing films such as those produced by stretching a hydrophilic polymeric film comprising a partially saponified product of an ehtylene-vinyl acetate copolymer and absorbing iodine and/or dichroic dye, and those comprising a polyene-oriented film such as a dechlorinated product of polyvinyl chloride. Alternatively, there may be used reflection type polarizers.

These polarizers may be used alone or in combination with a transparent protection layer provided on one or both surfaces of the polarizer for the purpose of enhancing the strength, moisture resistance, and heat resistance. Examples of the protection layer include those formed by laminating a transparent plastic film such as polyester, triacetyl cellulose or a cyclic olefin polymer directly or via an adhesive layer on the polarizer; coated layers of transparent resin; and acrylic- or epoxy-based photo-setting type resin layers. When the protection layers are coated on the both surfaces of the polarizing film, they may be the same or different from one another.

Next, the optical anisotropic layers used in the present invention will be described in turn.

First of all, the second and third optical anisotropic layers will be described.

There is no particular restriction on the second or third optical anisotropic layer used in the present invention as long as it is excellent in transparency and uniformity. However, the layer is preferably a polymeric stretched film or an optical film formed from a liquid crystalline material. Examples of the polymeric stretched film include uniaxial or biaxial retardation films formed from cellulose-, polycarbonate-, polyarylate-, polysulfone-, polyacryl-, polyethersulfone-, or cyclic olefin-based polymers. The second and third optical anisotropic layers exemplified herein may be composed of a polymeric stretched film or an optical film formed from a liquid crystalline material alone or the combination thereof. Among these polymeric stretched films, preferred are polycarbonate-based polymers and cyclic olefin-based polymers because they are cost effective and can restrain the change of color modulation of image quality due to their film uniformity and small birefringence wavelength dispersion.

Examples of the optical film formed from a liquid crystalline material include those comprised of various liquid crystalline polymeric compounds of main chain- and/or side chain-types, such as liquid crystalline polyesters, liquid crystalline polycarbonates, liquid crystalline polyacrylates, or low molecular weight liquid crystalline compounds having reactivities which can be polymerized by cross-linking or the like after being aligned. These films may be a single-layered film with self-supportivity or formed over a transparent supporting substrate.

When the x and y directions are taken in the plane direction and the thickness direction is defined as z direction, a positive uniaxial optical anisotropic layer has a relation of refractive index defined by nx>ny=nz. A positive biaxial optical anisotropic layer has a relation of refractive index defined by nx>nz>ny. A negative uniaxial optical anisotropic layer has a relation of refractive index defined by nx=ny>nz. A negative biaxial optical anisotropic layer has a relation of refractive index defined by nx>ny>nz.

When the thickness of the second optical anisotropic layer is defined as d2, the main refractive indices in the plane are defined as Nx2 and Ny2, the main refractive index in the thickness direction is defined as Nz2, Nx2>Nz2≧Ny2, and the retardation value in the plane with respect to a light of a wavelength of 550 nm is defined as Re2=(Nx2−Ny2)xd2 [nm], the retardation value (Re2) in the plane of the second optical anisotropic layer is usually from 50 to 180 nm, preferably from 70 to 160 nm, more preferably from 100 to 140 nm. If the Re2 value deviates these ranges, sufficient viewing angle improving effect may not be obtained or unnecessary coloration may occur when viewed obliquely.

The third optical anisotropic layer is used for compensating the viewing angles of two polarizers arranged in an orthogonal relation to one another. When the thickness of the third optical anisotropic layer is defined as d3, the main refractive indices in the plane are defined as Nx3 and Ny3, the main refractive index in the thickness direction is defined as Nz3, Nx3>Nz3≧Ny3, and the retardation value in the plane with respect to a light of a wavelength of 550 nm is defined as Re3=(Nx3−Ny3)xd3 [nm], the retardation value (Re3) in the plane of the third optical anisotropic layer is usually from 50 to 200 nm, preferably from 70 to 180 nm, more preferably from 100 to 140 nm. If the Re3 value deviates these ranges, sufficient viewing angle improving effect may not be obtained or unnecessary coloration may occur when viewed obliquely.

The first optical anisotropic layer used in the present invention is a layer comprising at least a liquid crystal film produced by fixing a liquid crystalline polymer exhibiting an optically positive uniaxiality, more specifically a polymeric liquid crystalline compound exhibiting an optically positive uniaxiality or a polymeric liquid crystal composition containing at least one type selected from the polymeric liquid crystalline compounds and exhibiting an optically positive uniaxiality, in a nematic hybrid alignment with an average tilt angle of 5 to 45 degrees, formed when the liquid crystalline polymeric compound or composition is in a liquid crystal state.

The term "nematic hybrid alignment" used herein refers to an alignment structure wherein the liquid crystal molecules are aligned in a nematic alignment wherein the angles of the directors of the liquid crystalline molecules relative to the film upper surface and the lower film surface are different from each other. Therefore, since the angles formed by the directors and the film planes are different between in the vicinities of the upper and lower interfaces of the film, the nematic hybrid alignment can be referred to as an alignment wherein the angles vary continuously between the upper and lower film surfaces.

In a liquid crystal film with a fixed nematic hybrid alignment structure, the directors of the liquid crystalline molecules are directed at different angles in all the positions in the film thickness direction. Therefore, optical axis no longer exists when the film is viewed as the whole film structure.

The term "average tilt angle" used herein refers to an average value of the angles defined between the directors of the liquid crystalline molecules and a film plane, in the thickness direction of the liquid crystal film. In the liquid crystal film used in the present invention, the absolute value of the angle formed by a director in the vicinity of one of the film surfaces and the film surface is generally from 20 to 90 degrees, preferably from 40 to 80 degrees, more preferably from 50 to 60 degrees while the absolute value of the angle formed by the director and the other film surface is generally from 0 to 20 degrees, preferably from 0 to 10 degrees. The absolute value of the average tilt angle is generally from 5 to 45 degrees, preferably 20 to 45 degrees, more preferably 25 to 45 degrees.

The average tilt angle, if deviating from the above ranges, would cause the contrast of the resulting liquid crystal display device to decrease when the device is viewed from an oblique direction. The average tilt angle can be determined by applying a crystal rotation method.

The liquid crystal film forming the first optical anisotropic layer used in the present invention comprises a liquid crystalline polymeric compound or a liquid crystalline polymeric composition as described above with a fixed nematic hybrid alignment and a specific average tilt angle but may be formed from any liquid crystalline material as long as the material can be aligned in a nematic hybrid alignment and satisfies the requirement concerning the specific average tilt angle, as described above. For example, the film may be a liquid crystal film produced by allowing a low molecular weight liquid crystalline material to be in a liquid crystal state, and then aligning the material in a nematic hybrid alignment and fixing the aligned alignment by photo- or thermal- cross-linking. The term "liquid crystal film" used herein refers to those produced by forming a liquid crystalline substance such as a low molecular weight or polymeric liquid crystalline substance into a film, regardless of whether or not the liquid crystal film itself exhibits liquid crystallinity.

With regard to an apparent retardation value in the plane of a liquid crystal film forming the first optical anisotropic layer when viewed from the normal direction thereof, the refractive index (ne) in the direction parallel to directors is different from the refractive index (no) in the direction perpendicular to directors, in a liquid crystal film with a fixed nematic hybrid alignment structure and, therefore, assuming that the value obtained by subtracting no from ne (ne-no) is an apparent birefringence, an apparent retardation value is given as the product of the apparent birefringence and the absolute film thickness. This retardation value is easily obtained by a polarization optical measurement such as ellipsometry. The retardation value of the liquid crystal film used as the optical anisotropic layer is from 20 to 140 nm with respect to a monochromic light of 550 nm. A retardation value of smaller than 20 nm would result in failure to attain a sufficient viewing angle widening effect. A retardation value of larger than 140 nm would cause unnecessary coloration on the liquid crystal display device when viewed obliquely.

The average tilt angle and retardation value of the liquid crystal film forming the first optical anisotropic layer are necessarily within the above-described ranges. The thickness of the film varies depending on the physical properties of the liquid crystalline polymer or liquid crystalline compound forming the first optical anisotropic layer but is usually from 0.2 to 10 µm, preferably from 0.3 to 5 µm, particularly preferably from 0.5 to 2 µn. A film thickness of less than 0.2 µm would fail to attain a sufficient compensation effect. A film thickness of greater than 10 µm would cause unnecessary colored image in the liquid crystal display device.

Figure 2:
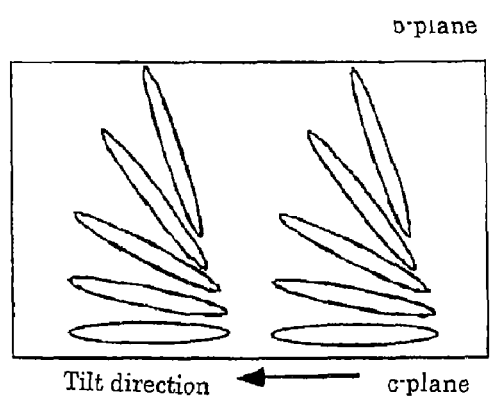
FIG. 2 is a conceptual view for describing the aligned structure of the liquid crystal film forming the second optical anisotropic layer.
Figure 3:
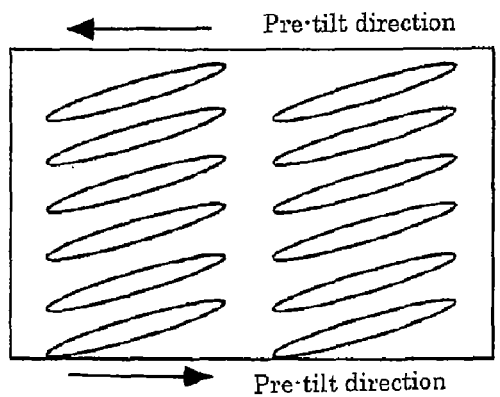
FIG. 3 is a conceptual view for describing the pre-tilt direction of the liquid crystal cell.

The specific conditions for the arrangement of the optical anisotropic layers in the liquid crystal display device of the present invention will be described in more details. In order to describe the specific arrangement conditions, the upper and lower planes and tilt direction of the optical anisotropic layer formed of a liquid crystal film and the pre-tilt direction of the liquid crystal cell are defined as follows using FIGS. 1 to 3.

When the upper and lower planes of the optical anisotropic layer formed of the liquid crystal film are defined by the angles formed by the directors of the liquid crystalline molecules in the vicinity of the film interfaces and the film planes, the plane forming an angle of 20 to 90 degrees at the acute angle side with the director is defined as "b-plane", while the plane forming an angle of 0 to 20 degrees at the acute angle side with the director is defined as "c-plane". When c-plane is viewed from b-plane through the optical anisotropic layer, the direction in which the angles between the directors of the liquid crystal molecules and the projection thereof to the c-plane are acute and which is parallel to the projection is defined as "tilt direction" (see FIGS. 1 and 2).

Next, on the cell interface of the liquid crystal cell, the low molecular weight liquid crystal for driving the liquid crystal cell is not generally parallel to the cell interface and tilted at a certain angle, which angle is generally referred to as "pre-tilt angle". However, a direction along which the director of a liquid crystalline molecule on the cell interface and the projection thereof form an acute angle and which is parallel to the projection is herein defined as "pre-tilt direction of the liquid crystal cell" (see FIG. 3).

The first, second and third optical anisotropic layers and the polarizers may be attached to one another via an adhesive or tacky adhesive layer.

There is no particular restriction on adhesives for forming the adhesive layer as long as they have enough adhesivity to the optical anisotropic layers and do not harm the optical characteristics thereof. Examples of the adhesives include acrylic resin-, methacrylic resin-, epoxy resin-, ethylene-vinyl acetate copolymer-, rubber-, urethane-, polyvinylether-based adhesives, and mixtures thereof and various reactive adhesives such as of thermal curing and/or photo curing types, and electron radiation curing types. The adhesive may be an adhesive having a function of a transparent protection layer for protecting the optical anisotropic layers.

There is no particular restriction on tacky adhesives for forming the tacky adhesive layer. There may be used any tacky adhesive appropriately selected from those containing a polymer such as an acrylic polymer, a silicone-based polymer, a polyester, a polyurethane, a polyamide, a polyether, a fluorine- or rubber-based polymer as a base polymer. In particular, it is preferred to use a tacky adhesive such as an acrylic tacky adhesive which is excellent in optical transparency, weather resistance and heat resistance and readily adjustable in wettability, cohesivity and adhesivity.

The adhesive layer or tacky adhesive layer (hereinafter may be collectively referred to as "tacky/adhesive layer") may be formed by any suitable method. Examples of the method include a method wherein a base polymer or a composition thereof is dissolved or dispersed in a solvent containing toluene or ethyl acetate alone or in combination thereby preparing a tacky/adhesive solution containing 10 to 40 percent by mass of the adhesive, which solution is then directly laid over the above-described optical anisotropic layer by an appropriate developing method such as casting or coating or a method wherein a tacky/adhesive layer is formed in accordance with the method as described above on a separator and then transferred onto the optical anisotropic layers. The tacky/adhesive layer may contain additives such as natural or synthetic resins, in particular fillers or pigments containing tackiness-imparting resins, glass fibers, glass beads, metal powders, and other inorganic powders, dyes, and anti-oxidants. The tacky/adhesive layer may contain fine particles so as to exhibit light diffusivity.

When the optical anisotropic layers are attached to one another via a tacky/adhesive layer, they may be subjected to a surface treatment so as to improve their adhesivity to the tacky/adhesive layer. There is no particular restriction on the method of the surface treatment. There may be suitably used a surface treatment such as corona discharge, sputtering, low-pressure UV irradiation, or plasma treatment, which can maintain the transparency of the liquid crystal film surface. Among these surface treatments, corona discharge treatment is excellent.

Next, explanation will be given of the configurations of the liquid crystal display devices comprising the above-described members, according to the present invention.

The configurations of the liquid crystal display devices of the present invention are necessarily selected from the following six patterns as shown in FIGS. 4, 7, 10, 13, 16 and 19:

(1) polarizer/third optical anisotropic layer/liquid crystal cell/first optical anisotropic layer/second optical anisotropic layer/polarizer/backlight (2) polarizer/second optical anisotropic layer/first optical anisotropic layer/liquid crystal cell/third optical anisotropic layer/polarizer/backlight (3) polarizer/third optical anisotropic layer/second optical anisotropic layer/liquid crystal cell/first optical anisotropic layer/polarizer/backlight (4) polarizer/first optical anisotropic layer/liquid crystal cell/second optical anisotropic layer/third optical anisotropic layer/polarizer/backlight (5) polarizer/third optical anisotropic layer/first optical anisotropic layer/liquid crystal cell/second optical anisotropic layer/polarizer/backlight (6) polarizer/second optical anisotropic layer/liquid crystal cell/first optical anisotropic layer/third optical anisotropic layer/polarizer/backlight.

The angle formed by the pre-tilt direction of the liquid crystal layer in the liquid crystal cell and the tilt direction of the first optical anisotropic layer formed of a liquid crystal film wherein a nematic hybrid alignment is fixed is preferably from 0 to 30 degrees, more preferably 0 to 20 degrees, particularly preferably from 0 to 10 degrees. The angle if larger than 30 degrees would fail to attain a sufficient viewing angle compensation effect.

The angle formed by the slow axis of the second optical anisotropic layer and the tilt direction of the first optical anisotropic layer is preferably 70 degrees or larger and 110 degrees or smaller, more preferably 80 degrees or larger and 100 degrees or smaller. The angle if larger than 110 degrees or smaller than 70 degrees would cause a reduction in front contrast.

The angle formed by the tilt direction of the first optical anisotropic layer and the absorption axis of the polarizer is preferably 30 degrees or larger and 60 degrees or smaller, more preferably 40 degrees or larger and 50 degrees or smaller. The angle if larger than 60 degrees or smaller than 30 degrees would cause a reduction in front contrast.

The angle formed by the slow axis of the second optical anisotropic layer and the absorption axis of the polarizer is preferably 30 degrees or larger and 60 degrees or smaller, more preferably 40 degrees or larger and 50 degrees or smaller. The angle if larger than 60 degrees or smaller than 30 degrees would cause a reduction in front contrast.

The angle formed by the slow axis of the third optical anisotropic layer and the absorption axis of the polarizer is preferably orthogonal or parallel. That is, the orthogonal is usually from 80 to 100 degrees, preferably from 85 to 95 degrees, more preferably within the range of about 90 degrees. The parallel is within the range of usually 10 degrees or smaller, preferably 5 degrees or smaller, more preferably about 0 degree. When the angle deviates from these ranges, the front contrast would be reduced and would cause a reduction in image quality.

There is no particular restriction on the aforesaid light diffusion layer, backlight, light controlling film, light guide plate and prism sheet, which may be those that have been conventionally used.

In addition to the above-described components, the liquid crystal display device of the present invention may be provided with other additional components. For example, the use of a color filter makes it possible to produce a color liquid crystal display device which can provide multi- or full-colored display images with increased color purity.

The vertical alignment type liquid crystal display device of the present invention has characteristics that it is bright in display images, high in front contrast and less in viewing angle dependency and thus is suitably used for office automation (OA) equipment such as word processors and personal computers, mobile information terminals such as a personal digital assistants and mobile telephones, or camcorders equipped with a liquid crystal monitor.

EXAMPLES

The present invention will be further described in the following examples, but the present invention should not be construed as being limited thereto. The retardations (Δnd) in the examples are values at a wavelength of 550 nm, unless stated otherwise.

(1) Measurement of Film Thickness

Measurement of film thickness was carried out using SURFACE TEXTURE ANALYSIS SYSTEM Dektak 3030ST manufactured by SLOAN Co. A method was also used in which the film thickness was determined by interference measurement ("Ultraviolet Visible Near-Infrared Spectrophotometer V-570" available from JASCO Corporation) and refractive index data.

(2) Parameter Measurement of Liquid Crystal Film

The measurement was carried out using an automatic birefringence analyzer KOBRA21ADH manufactured by Oji Scientific Instruments.

Example 1

Figure 4:
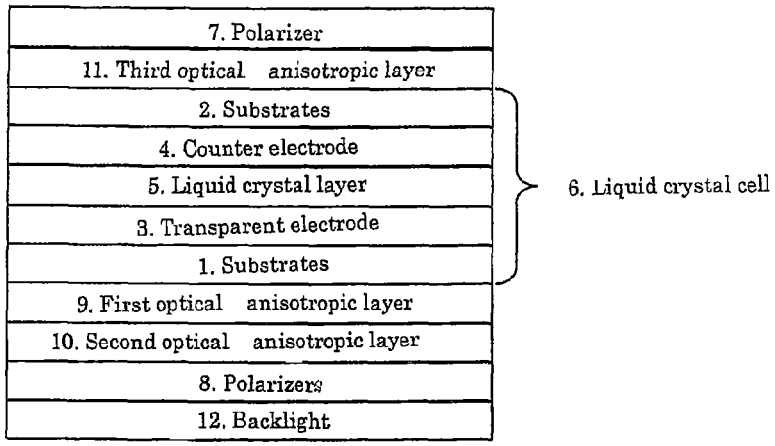
FIG. 4 is a schematic cross-sectional view of the liquid crystal display device of Example

The configuration and axis arrangement of the liquid crystal display device of Example 1 will be described with reference to FIGS. 4 and 5, respectively.

On a substrate 1 is arranged a transparent electrode 3 formed from a highly transmissive material such as ITO while on a substrate 2 is arranged a counter electrode 4 formed from a highly transmissive material such as ITO. A liquid crystal layer 5 formed from a liquid crystalline material exhibiting a positive dielectric anisotropy is sandwiched between the transparent electrode 3 and the counter electrode 4. A third optical anisotropic layer 11 and a polarizer 7 are arranged on the side of the substrate 2, opposite to the side on which the counter electrode 4 is formed while a first optical anisotropic layer 9, a second optical anisotropic layer 10 and a polarizer 8 are arranged on the side of the substrate 1, opposite to the side on which the transparent electrode 3 is formed. A backlight 12 is arranged in the rear side of the polarizer 8, as viewed from the viewer.

In accordance with the disclosures of Japanese Patent Application Laid-Open Publication No. 6-347742, the first optical anisotropic layer 9 (Δnd: 120 nm) was prepared which layer is formed of a 0.69 μm thick liquid crystal film with a fixed nematic hybrid alignment wherein the average tilt angle in the film thickness direction is 28 degrees. A liquid crystal display device was produced so as to have an axis arrangement as shown in FIG. 5.

The liquid crystal cell 6 used in this example was produced using ZLI-1695 manufactured by Merck Ltd as a liquid crystalline material so that the liquid crystal layer thickness was 4.9 μm. The pre-tilt angle at both of the cell interfaces was 3 degrees, while the Δnd of the liquid crystal cell was approximately 320 nm.

SQW-062 manufactured by Sumitomo Chemical Industry Co., Ltd. (thickness: about 100 μm) was used as the polarizers 7, 8.

A polymeric stretched film formed of a uniaxially stretched polycarbonate film was used as the second optical anisotropic layer 10 (Δnd: about 170 nm).

The third optical anisotropic layer 11 was a polymeric stretched film formed of a norbornene-based film (ZEONOR manufactured by ZEON CORPORATION, Δnd: about 100 nm).

Figure 5:
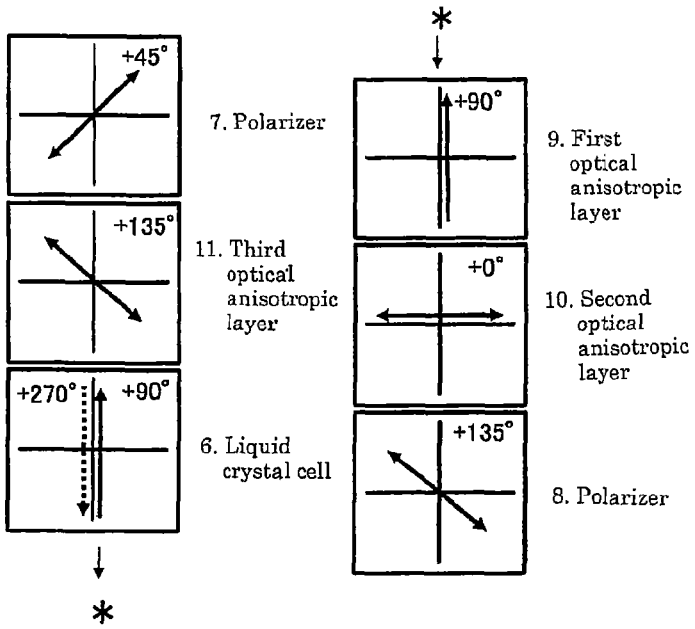
FIG. 5 is a plan view indicating the angular relation of the absorption axes of the polarizers, the pre-tilt direction of the liquid crystal cell, the slow axes of the polymeric stretched films and the tilt direction of the liquid crystal film in Example 1.

The absorption axes of the polarizers 7, 8, the pre-tilt direction of the cell 6 at both of the interfaces, the tilt direction of the liquid crystal film 9 and the slow axes of the polymeric stretched films 10, 11 were oriented as shown in FIG. 5.

Figure 6:
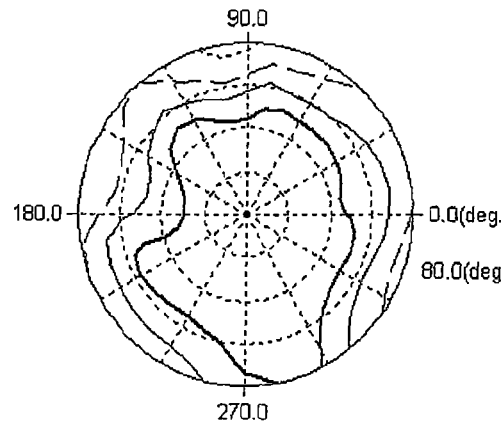
FIG. 6 is a view indicating the contrast ratio when viewing the liquid crystal display device of Example 1 from all the directions.

FIG. 6 shows the contrast ratio from all the directions defined by the transmissivity ratio of white image 0 V and black image 5 V "(white image)/(black image)".

It was confirmed from FIG. 6 that the liquid crystal display device had excellent viewing angle characteristics. The concentric circles are drawn to be at an interval of 20 degrees. Therefore, the outermost circle indicates 80 degrees from the center. The contrast contour lines indicate 50, 30, 10, and 2 from the innermost (the same is applied to the subsequent drawings).

Example 2

Figure 7:
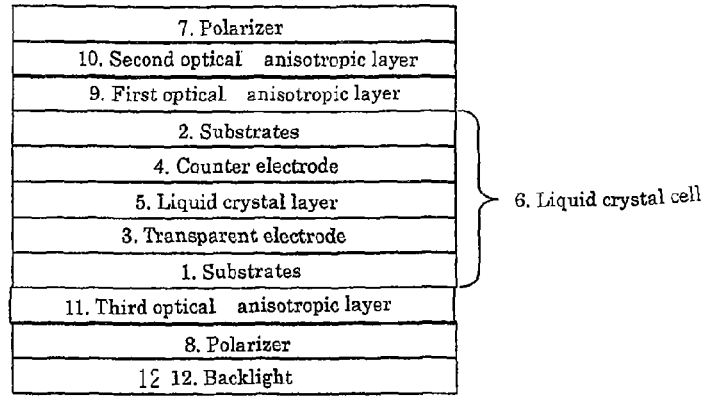
FIG. 7 is a schematic cross-sectional view of the liquid crystal display device of Example 2.

The configuration and axis arrangement of the liquid crystal display device of Example 2 will be described with reference to FIGS. 7 and 8, respectively.

The liquid crystal cell 6 of Example 1 was used. On the side of the substrate 2 opposite to the side on which the counter electrode 4 was formed were arranged a first optical anisotropic layer 9, a second optical anisotropic layer 10 and a polarizer 7. On the side of the substrate 1 opposite to the side on which the transparent electrode 3 was formed were arranged a third optical anisotropic layer 11 and a polarizer 8. A backlight 12 was arranged in the rear of the polarizer 8.

The polarizers 7,8, first optical anisotropic layer 9, second optical anisotropic layer 10 and third optical anisotropic layer 11 were the same as those used in Example 1.

Figure 8:
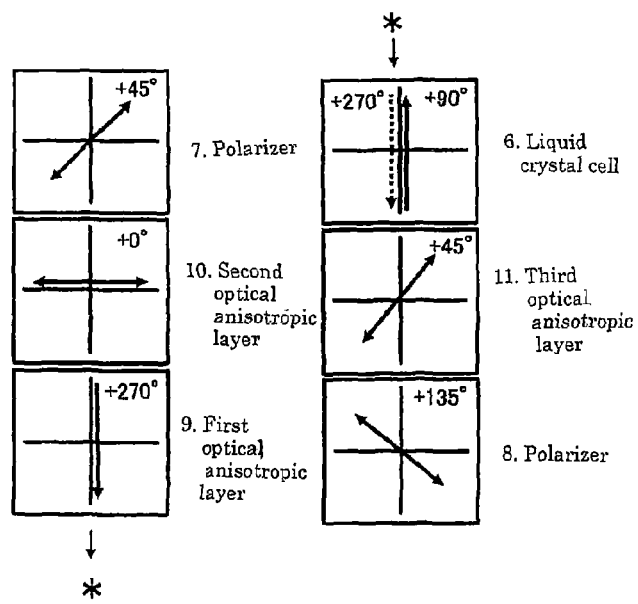
FIG. 8 is a plan view indicating the angular relation of the absorption axes of the polarizers, the pre-tilt direction of the liquid crystal cell, the slow axes of the polymeric stretched films and the tilt direction of the liquid crystal film in Example 2.

The absorption axes of the polarizers 7, 8, the pre-tilt direction of the cell 6 at both of the interfaces, the tilt direction of the liquid crystal film 9 and the slow axes of the polymeric stretched films 10, 11 were oriented as shown in FIG. 8.

Figure 9:
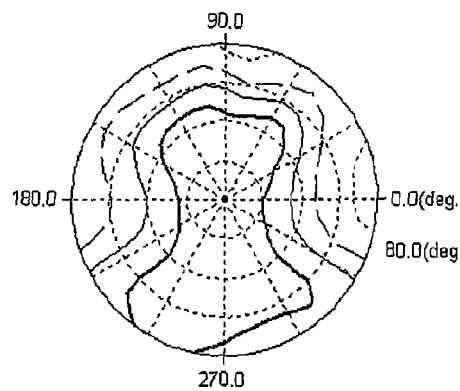
FIG. 9 is a view indicating the contrast ratio when viewing the liquid crystal display device of Example 2 from all the directions.

FIG. 9 shows the contrast ratio from all the directions defined by the transmissivity ratio of white image 0 V and black image 5 V "(white image)/(black image)".

It was confirmed from FIG. 9 that the liquid crystal display device had excellent viewing angle characteristics.

Example 3

Figure 10:
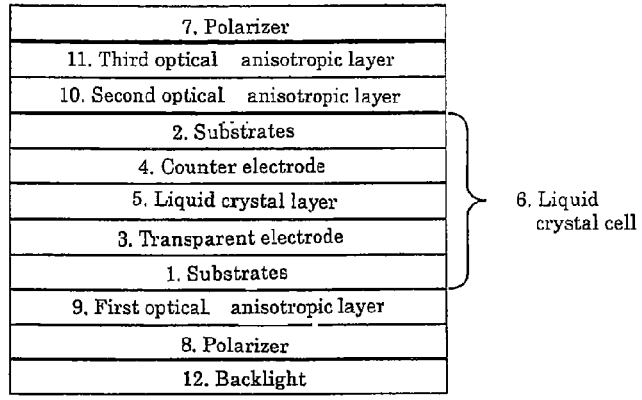
FIG. 10 is a schematic cross-sectional view of the liquid crystal display device of Example 3.
Figure 11:
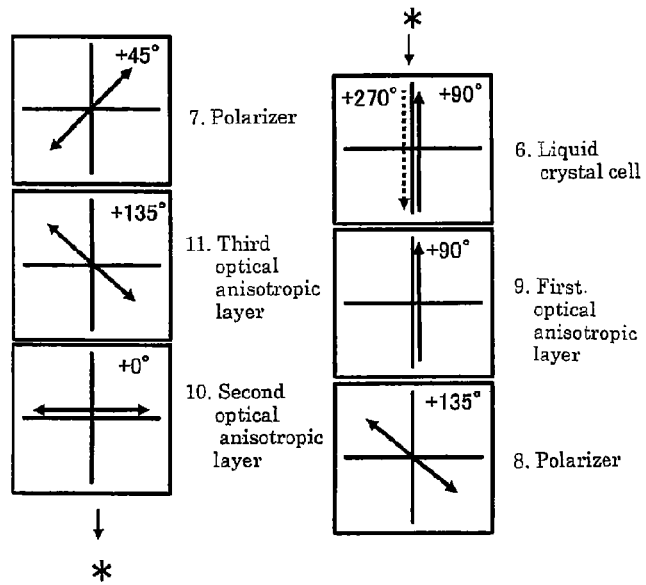
FIG. 11 is a plan view indicating the angular relation of the absorption axes of the polarizers, the pre-tilt direction of the liquid crystal cell, the slow axes of the polymeric stretched films and the tilt direction of the liquid crystal film in Example 3.

The configuration and axis arrangement of the liquid crystal display device of Example 3 will be described with reference to FIGS. 10 and 11, respectively.

The liquid crystal display device of this example was prepared with the same procedures of Example 1 except that the position of the second optical anisotropic layer 10 was shifted from between the first optical anisotropic layer 9 and the polarizer 8 to between the third optical anisotropic layer 11 and the substrate 2.

Figure 12:
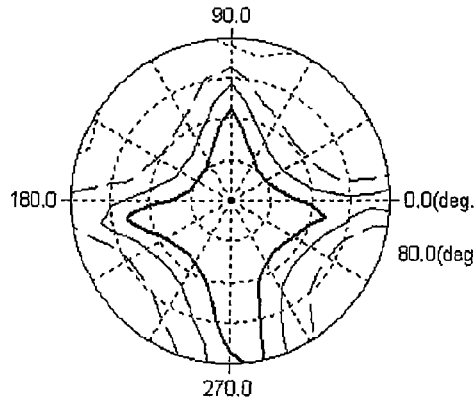
FIG. 12 is a view indicating the contrast ratio when viewing the liquid crystal display device of Example 3 from all the directions.

FIG. 12 shows the contrast ratio from all the directions defined by the transmissivity ratio of white image 0 V and black image 5 V "(white image)/(black image)".

It was confirmed from FIG. 12 that the liquid crystal display device had excellent viewing angle characteristics.

Example 4

Figure 13:
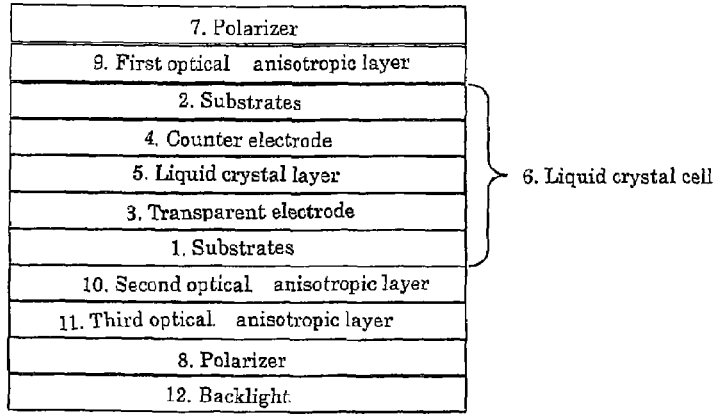
FIG. 13 is a schematic cross-sectional view of the liquid crystal display device of Example 4.
Figure 14:
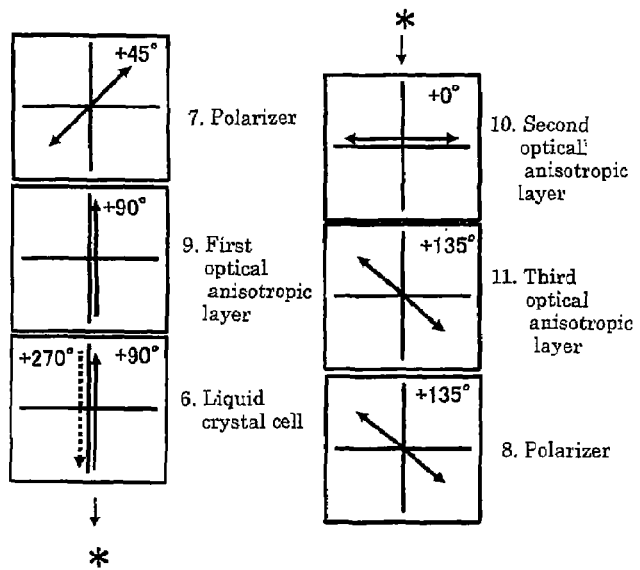
FIG. 14 is a plan view indicating the angular relation of the absorption axes of the polarizers, the pre-tilt direction of the liquid crystal cell, the slow axes of the polymeric stretched films and the tilt direction of the liquid crystal film in Example 4.

The configuration and axis arrangement of the liquid crystal display device of Example 4 will be described with reference to FIGS. 13 and 14, respectively.

The liquid crystal display device of this example was prepared with the same procedures of Example 2 except that the position of the second optical anisotropic layer 10 was shifted from between the first optical anisotropic layer 9 and the polarizer 7 to between the third optical anisotropic layer 11 and the substrate 1.

Figure 15:
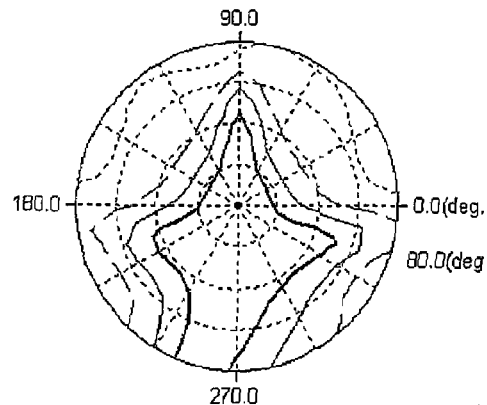
FIG. 15 is a view indicating the contrast ratio when viewing the liquid crystal display device of Example 4 from all the directions.

FIG. 15 shows the contrast ratio from all the directions defined by the transmissivity ratio of white image 0 V and black image 5 V "(white image)/(black image)".

It was confirmed from FIG. 15 that the liquid crystal display device had excellent viewing angle characteristics.

Example 5

Figure 16:
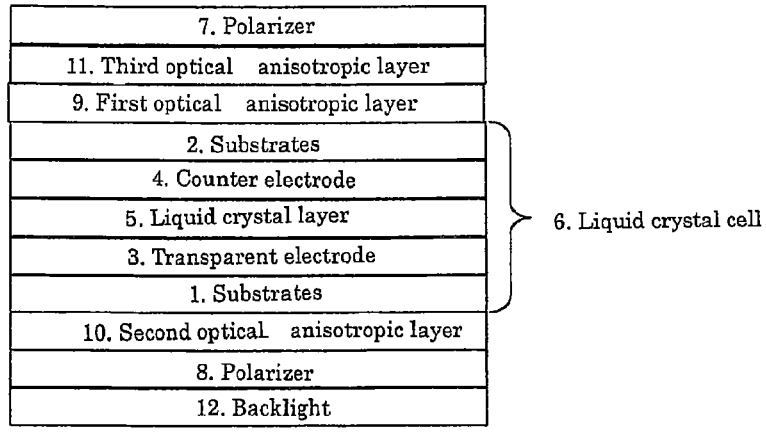
FIG. 16 is a schematic cross-sectional view of the liquid crystal display device of Example 5.
Figure 17:
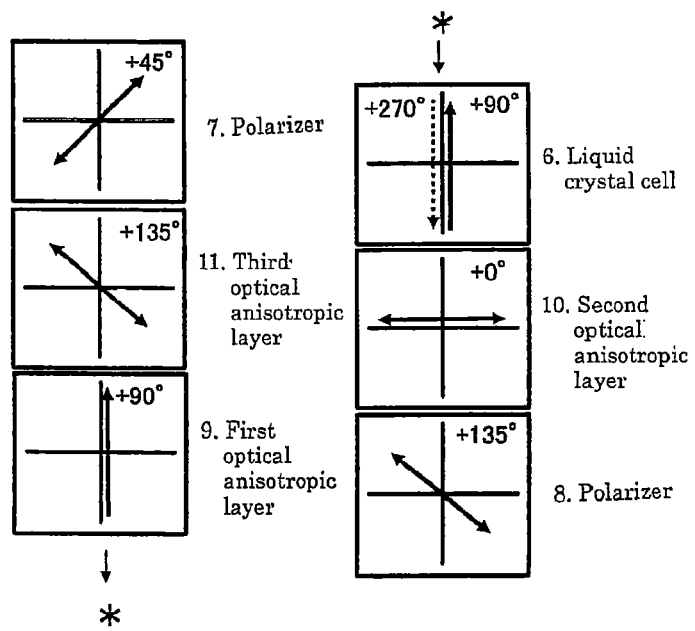
FIG. 17 is a plan view indicating the angular relation of the absorption axes of the polarizers, the pre-tilt direction of the liquid crystal cell, the slow axes of the polymeric stretched films and the tilt direction of the liquid crystal film in Example 5.

The configuration and axis arrangement of the liquid crystal display device of Example 5 will be described with reference to FIGS. 16 and 17, respectively.

The liquid crystal display device of this example was prepared with the same procedures of Example 1 except that the position of the first optical anisotropic layer 9 was shifted from between the substrate 1 and the second optical anisotropic layer 10 to between the third optical anisotropic layer 11 and the substrate 2.

Figure 18:
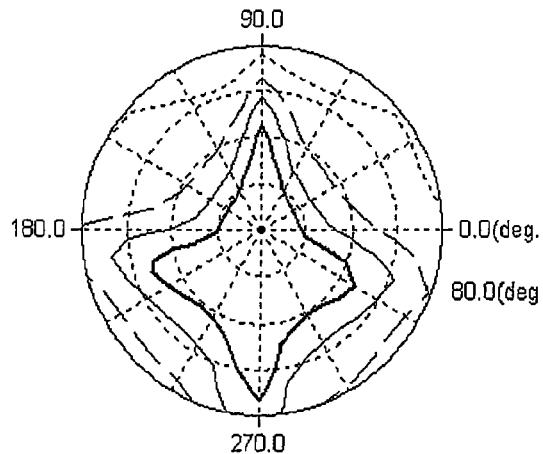
FIG. 18 is a view indicating the contrast ratio when viewing the liquid crystal display device of Example 5 from all the directions.

FIG. 18 shows the contrast ratio from all the directions defined by the transmissivity ratio of white image 0 V and black image 5 V "(white image)/(black image)".

It was confirmed from FIG. 18 that the liquid crystal display device had excellent viewing angle characteristics.

Example 6

Figure 19:
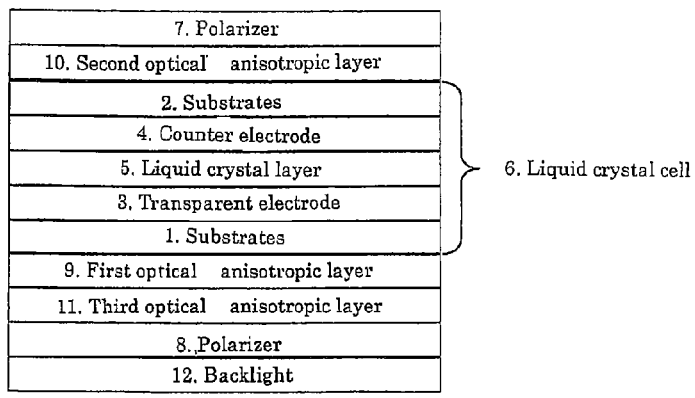
FIG. 19 is a schematic cross-sectional view of the liquid crystal display device of Example 6.
Figure 20:
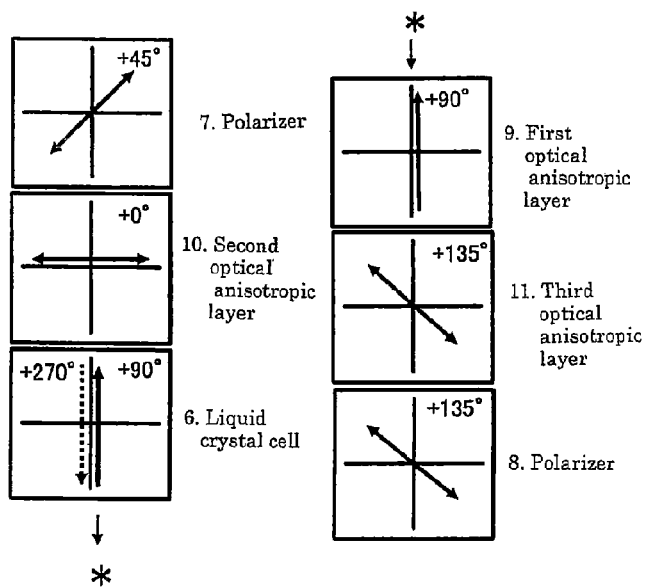
FIG. 20 is a plan view indicating the angular relation of the absorption axes of the polarizers, the pre-tilt direction of the liquid crystal cell, the slow axes of the polymeric stretched films and the tilt direction of the liquid crystal film in Example 6.

The configuration and axis arrangement of the liquid crystal display device of Example 6 will be described with reference to FIGS. 19 and 20, respectively.

The liquid crystal display device of this example was prepared with the same procedures of Example 2 except that the position of the first optical anisotropic layer 9 was shifted from between the substrate 2 and the second optical anisotropic layer 10 to between the third optical anisotropic layer 11 and the substrate 1.

Figure 21:
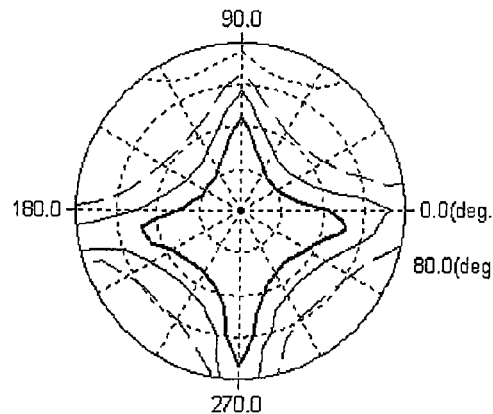
FIG. 21 is a view indicating the contrast ratio when viewing the liquid crystal display device of Example 6 from all the directions.

FIG. 21 shows the contrast ratio from all the directions defined by the transmissivity ratio of white image 0 V and black image 5 V "(white image)/(black image)".

It was confirmed from FIG. 21 that the liquid crystal display device had excellent viewing angle characteristics.

Comparative Example 1

Figure 22:
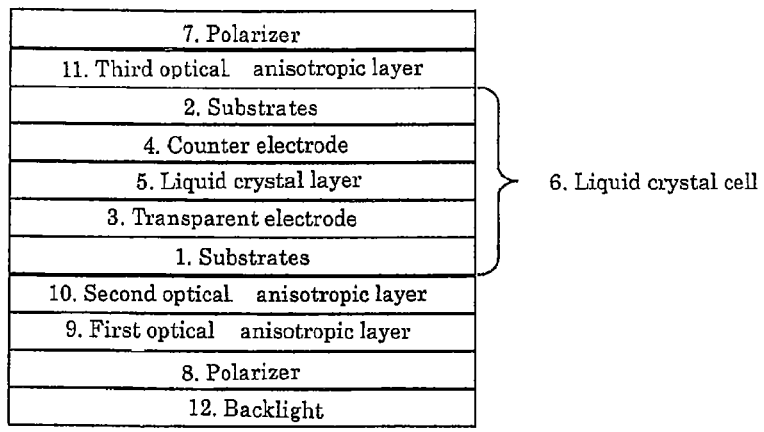
FIG. 22 is a schematic cross-sectional view of the liquid crystal display device of Comparative Example 1.
Figure 23:
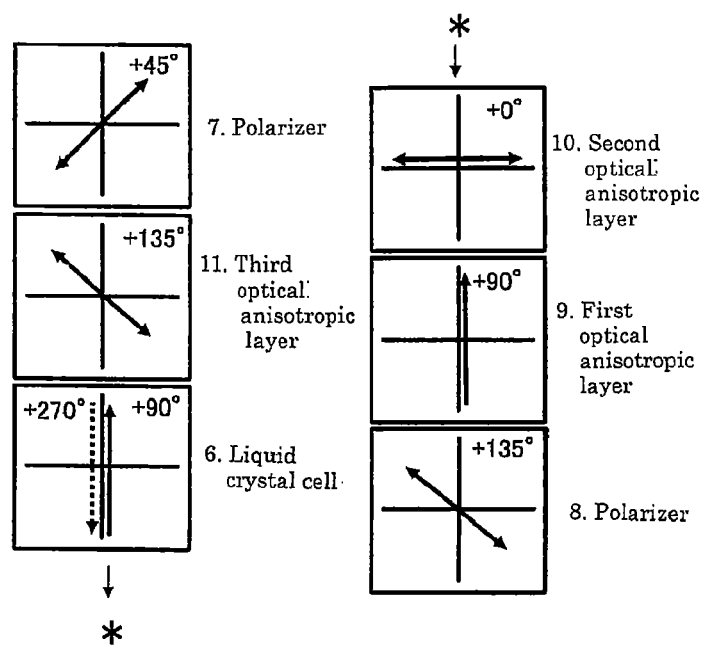
FIG. 23 is a plan view indicating the angular relation of the absorption axes of the polarizers, the pre-tilt direction of the liquid crystal cell, the slow axes of the polymeric stretched films and the tilt direction of the liquid crystal film in Comparative Example 1.

The configuration and axis arrangement of the liquid crystal display device of Comparative Example 1 will be described with reference to FIGS. 22 and 23, respectively.

The liquid crystal display device of this example was prepared with the same procedures of Example 1 except that the position of the first optical anisotropic layer 9 and the position of the second optical anisotropic layer 10 were switched to one another.

Figure 24:
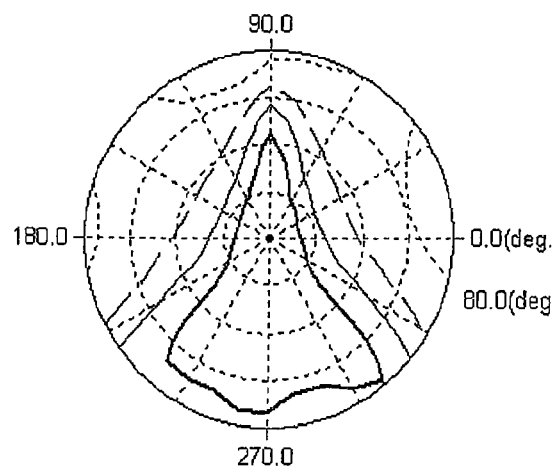
FIG. 24 is a view indicating the contrast ratio when viewing the liquid crystal display device of Comparative Example 1 from all the directions.

FIG. 24 shows the contrast ratio from all the directions defined by the transmissivity ratio of white image 0 V and black image 5 V "(white image)/(black image)".

With regard to viewing angle characteristics, Example 1 and Comparative Example 1 are compared.

As the result of comparison of the contrast contour lines shown in FIGS. 6 and 24, it is confirmed that viewing angle characteristics are significantly improved when the second optical anisotropic layer 10 was disposed in the backlight side of the liquid crystal cell (lower side of the drawing).

Comparative Example 2

Figure 25:
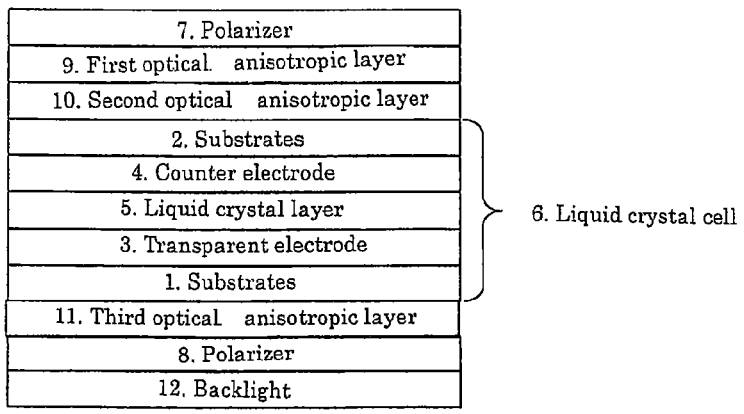
FIG. 25 is a schematic cross-sectional view of the liquid crystal display device of Comparative Example 2.
Figure 26:
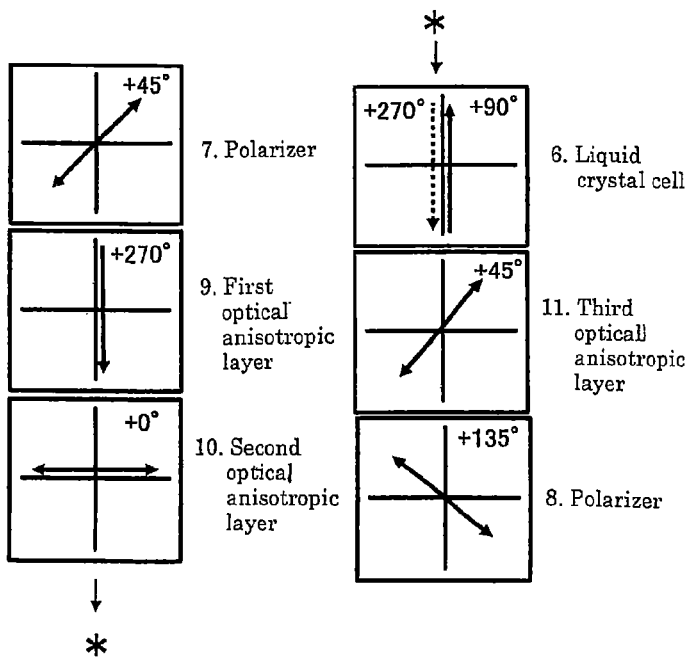
FIG. 26 is a plan view indicating the angular relation of the absorption axes of the polarizers, the pre-tilt direction of the liquid crystal cell, the slow axes of the polymeric stretched films and the tilt direction of the liquid crystal film in Comparative Example 2.

The configuration and axis arrangement of the liquid crystal display device of Comparative Example 2 will be described with reference to FIGS. 25 and 26, respectively.

The liquid crystal display device of this example was prepared with the same procedures of Example 2 except that the position of the first optical anisotropic layer 9 and the position of the second optical anisotropic layer 10 were switched to one another.

Figure 27:
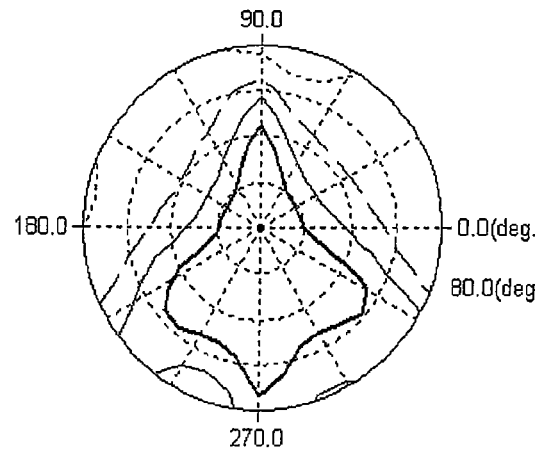
FIG. 27 is a view indicating the contrast ratio when viewing the liquid crystal display device of Comparative Example 2 from all the directions.

FIG. 27 shows the contrast ratio from all the directions defined by the transmissivity ratio of white image 0 V and black image 5 V "(white image)/(black image)".

With regard to viewing angle characteristics, Example 2 and Comparative Example 2 are compared.

As the result of comparison of the contrast contour lines shown in FIGS. 9 and 27, it is confirmed that viewing angle characteristics are significantly improved when the second optical anisotropic layer 10 was disposed in the backlight side of the liquid crystal cell (lower side of the drawing).

Comparative Example 3

Figure 28:
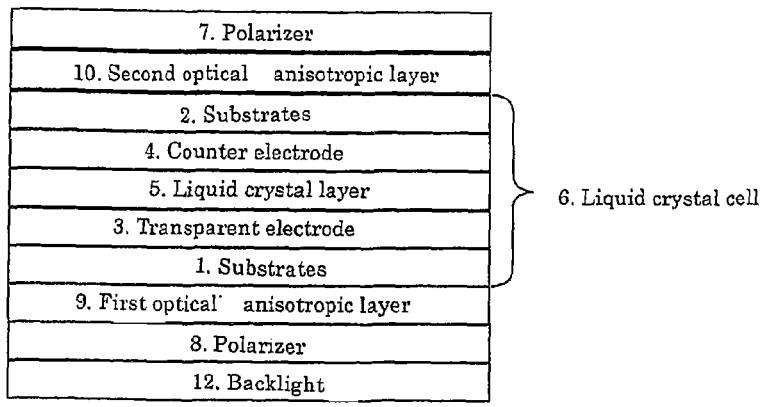
FIG. 28 is a schematic cross-sectional view of the liquid crystal display device of Comparative Example 3.
Figure 29:
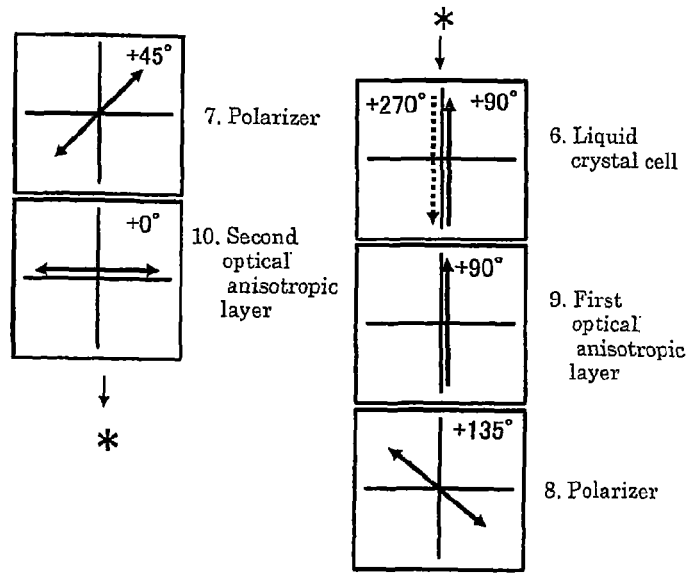
FIG. 29 is a plan view indicating the angular relation of the absorption axes of the polarizers, the pre-tilt direction of the liquid crystal cell, the slow axes of the polymeric stretched films and the tilt direction of the liquid crystal film in Comparative Example 3.

The configuration and axis arrangement of the liquid crystal display device of Comparative Example 3 will be described with reference to FIGS. 28 and 29, respectively. The liquid crystal display device of this example was prepared with the same procedures of Example 3 except that the third optical anisotropic layer 11 was excluded.

Figure 30:
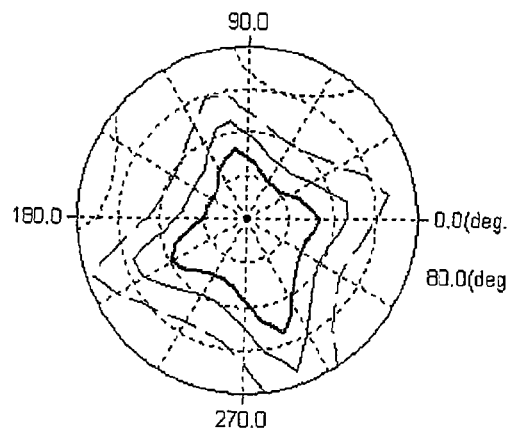
FIG. 30 is a view indicating the contrast ratio when viewing the liquid crystal display device of Comparative Example 3 from all the directions.

FIG. 30 shows the contrast ratio from all the directions defined by the transmissivity ratio of white image 0 V and black image 5 V "(white image)/(black image)".

With regard to viewing angle characteristics, Example 3 and Comparative Example 3 are compared.

As the result of comparison of the contrast contours in the all direction shown in FIGS. 6 and 30, it was confirmed that the viewing angle characteristics were extremely improved by adding the third optical anisotropic layer 11.

In these examples, the experiments were carried out without using a color filter. Of course, the provision of a color filter in the liquid crystal cell can provide excellent multi-color or full-color images.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A transmissive liquid crystal display device comprising at least:
   a backlight;
   a polarizer;
   a second optical anisotropic layer with a retardation of 50 to 180 nm at a wavelength of 550 nm;
   a first optical anisotropic layer with a retardation of 20 to 140 nm at a wavelength of 550 nm;
   a homogeneously aligned liquid crystal cell comprising upper and lower substrates facing each other and a liquid crystal layer sandwiched between the upper and lower substrates;
   a third optical anisotropic layer with a retardation of 50 to 200 nm at a wavelength of 550 nm; and
   a polarizer, arranged in piles in this order from the backlight,
   wherein the first optical anisotropic layer comprises at least a liquid crystal film with a fixed nematic hybrid liquid crystal alignment structure.

2. A transmissive liquid crystal display device comprising at least:
   a backlight;
   a polarizer;
   a third optical anisotropic layer with a retardation of 50 to 200 nm at a wavelength of 550 nm;
   a homogeneously aligned liquid crystal cell comprising upper and lower substrates facing each other and a liquid crystal layer sandwiched between the upper and lower substrates;
   a first optical anisotropic layer with a retardation of 20 to 140 nm at a wavelength of 550 nm;
   a second optical anisotropic layer with a retardation of 50 to 180 nm at a wavelength of 550 nm; and
   a polarizer, arranged in piles in this order from the backlight,
   wherein the first optical anisotropic layer comprises at least a liquid crystal film with a fixed nematic hybrid liquid crystal alignment structure.

3. A transmissive liquid crystal display device comprising at least:
   a backlight;
   a polarizer;
   a first optical anisotropic layer with a retardation of 20 to 140 nm at a wavelength of 550 nm;
   a homogeneously aligned liquid crystal cell comprising upper and lower substrates facing each other and a liquid crystal layer sandwiched between the upper and lower substrates;
   a second optical anisotropic layer with a retardation of 50 to 180 nm at a wavelength of 550 nm;
   a third optical anisotropic layer with a retardation of 50 to 200 nm at a wavelength of 550 nm; and
   a polarizer, arranged in piles in this order from the backlight,
   wherein the first optical anisotropic layer comprises at least a liquid crystal film with a fixed nematic hybrid liquid crystal alignment structure.

4. A transmissive liquid crystal display device comprising at least:
   a backlight;
   a polarizer;
   a third optical anisotropic layer with a retardation of 50 to 200 nm at a wavelength of 550 nm;
   a second optical anisotropic layer with a retardation of 50 to 180 nm at a wavelength of 550 nm;
   a homogeneously aligned liquid crystal cell comprising upper and lower substrates facing each other and a liquid crystal layer sandwiched between the upper and lower substrates;
   a first optical anisotropic layer with a retardation of 20 to 140 nm at a wavelength of 550 nm; and
   a polarizer, arranged in piles in this order from the backlight,
   wherein the first optical anisotropic layer comprises at least a liquid crystal film with a fixed nematic hybrid liquid crystal alignment structure.

5. A transmissive liquid crystal display device comprising at least:
   a backlight;
   a polarizer;
   a second optical anisotropic layer with a retardation of 50 to 180 nm at a wavelength of 550 nm;
   a homogeneously aligned liquid crystal cell comprising upper and lower substrates facing each other and a liquid crystal layer sandwiched between the upper and lower substrates;
   a first optical anisotropic layer with a retardation of 20 to 140 nm at a wavelength of 550 nm;
   a third optical anisotropic layer with a retardation of 50 to 200 nm at a wavelength of 550 nm; and
   a polarizer, arranged in piles in this order from the backlight,
   wherein the first optical anisotropic layer comprises at least a liquid crystal film with a fixed nematic hybrid liquid crystal alignment structure.

6. A transmissive liquid crystal display device comprising at least:
   a backlight;
   a polarizer;
   a third optical anisotropic layer with a retardation of 50 to 200 nm at a wavelength of 550 nm;
   a first optical anisotropic layer with a retardation of 20 to 140 nm at a wavelength of 550 nm;
   a homogeneously aligned liquid crystal cell comprising upper and lower substrates facing each other and a liquid crystal layer sandwiched between the upper and lower substrates;
   a second optical anisotropic layer with a retardation of 50 to 180 nm at a wavelength of 550 nm; and
   a polarizer, arranged in piles in this order from the backlight,
   wherein the first optical anisotropic layer comprises at least a liquid crystal film with a fixed nematic hybrid liquid crystal alignment structure.

7. The transmissive liquid crystal display device according to claim 1, wherein the second and third optical anisotropic layers each comprise a thermoplastic polymer containing a polycarbonate resin or a poly(cyclo-olefin) resin.

8. The transmissive liquid crystal display device according to claim 1, wherein the second and third optical anisotropic layers are each a liquid crystal film produced by fixing a liquid crystalline substance exhibiting an optically positive uniaxiality, in a nematic alignment formed when the substance is in the liquid crystal state.

9. The transmissive liquid crystal display device according to claim 1, wherein the polarizer and the third optical anisotropic layer are laminated so that the absorption axis of the former is perpendicular or parallel to the slow axis of the latter.

10. The transmissive liquid crystal display device according to claim 1, wherein the angle defined by the tilt direction of the hybrid direction of the liquid crystal film forming the first optical anisotropic layer, projected to the substrate plane thereof and the rubbing direction of the liquid crystal layer is in the range of 30 degrees or smaller.

11. The transmissive liquid crystal display device according to claim 1, wherein the angle defined by the tilt direction of the hybrid direction of the liquid crystal film forming the first optical anisotropic layer, projected to the substrate plane thereof and the slow axis of the second optical anisotropic layer is in the range of 70 degrees or larger and 110 degrees or smaller.

12. The transmissive liquid crystal display device according claim 1, wherein the angle defined by the absorption angle of the polarizer and the tilt direction of the hybrid direction of the liquid crystal film forming the first optical anisotropic layer, projected to the substrate plane thereof is in the range of 30 degrees or larger and 60 degrees or smaller.

13. The transmissive liquid crystal display device according to claim 1, wherein the first optical anisotropic layer is a liquid crystal film produced by fixing a liquid crystalline substance exhibiting an optically positive uniaxiality, in a nematic hybrid alignment formed when the substance is in the liquid crystal state, the average tilt angle of the nematic hybrid alignment being in the range of 5 to 45 degrees.

* * * * *